Feb. 13, 1968            M. L. CARTER            3,368,580

MEANS AND METHOD OF SUPPLYING TREATED WATER TO LIVESTOCK

Filed Oct. 10, 1966                         2 Sheets-Sheet 1

INVENTOR
MARK L. CARTER

ATTORNEY

Feb. 13, 1968  M. L. CARTER  3,368,580
MEANS AND METHOD OF SUPPLYING TREATED WATER TO LIVESTOCK
Filed Oct. 10, 1966  2 Sheets-Sheet 2

INVENTOR
MARK L. CARTER

BY *McLean, Morton & Boustead*
ATTORNEYS

United States Patent Office 3,368,580
Patented Feb. 13, 1968

3,368,580
MEANS AND METHOD OF SUPPLYING TREATED
WATER TO LIVESTOCK
Mark L. Carter, P.O. Box 327,
Hoven, S. Dak. 57450
Continuation-in-part of application Ser. No. 498,567,
Oct. 20, 1965. This application Oct. 10, 1966, Ser.
No. 601,247
3 Claims. (Cl. 137—412)

ABSTRACT OF THE DISCLOSURE

Apparatus for delivering water containing an automatically controlled proportion of liquid additive to an ordinary watering trough for livestock.

---

This is a continuation-in-part of my copending application Ser. No. 498,567 filed Oct. 20, 1965, now abandoned.

The present invention relates to a means and method for supplying treated drinking water to livestock. More specifically, this invention provides a means and method for automatically mixing an additive in a predetermined proportion to the ordinary drinking water provided livestock.

It has been found that certain medicines and food supplements are most advantageously supplied livestock through their drinking water. Another possibility of supply utilizing the habits of ordinary consumption by the animals exists in supplying these additives directly with the food consumed. However, this latter mode of supply is adaptable to use only with solid additives. As the great majority of desirable additives are water-soluble, they may be supplied more easily through the drinking water afforded the livestock. This avoids selectivity by the animals which might otherwise allow them to avoid solid additives in solids. Additionally, an animal's demand for water is more regular than its demand for food, enabling a more accurate estimate of the amount of such additives that will regularly be consumed. Further, many such additives could not be supplied in solid form but must be supplied the livestock in solution. Consequently, an ideal vehicle for the supply of these additives is the drinking water regularly consumed by the livestock.

Previously, devices that have provided automatic proportioning for the introduction of additives to water have been complicated and expensive. Water-actuated pumps are available to pump the additives in a predetermined proportion for mixing in the flowing water. Such devices heretofore have been of fixed proportion capacity and have required either expensive adjustments or multiple pumps to increase the capacity of the proportioning system.

Also, aspirators or water jet pumps have been used to add one liquid to another in predetermined proportions as shown by U.S. Patents 2,230,201 and 2,215,132. They have not had a check valve to prohibit dilution of the additive by the water, nor have they been actuated automatically.

A check valve has been actuated by a partial vacuum created by flowing water as described in U.S. Patent 2,065,583. But, that device was more complicated and designed for an entirely different purpose. It worked to overcome gravitational force rather than enlisting the aid of gravity in its operation. Consequently, that device required a more rapid flow of water to actuate the water pump. Some such devices have required a flowing water pressure of twenty-five pounds or more to operate satisfactorily.

I have discovered a means and method for accomplishing these results that is much simpler and more flexible than any of those previously known. My method consists briefly of using a relatively large watering trough with a jar or tank containing the additive positioned underneath or alongside the trough. A water supply line may be connected to an ordinary water supply means such as a pump and positioned so that the pumped water is delivered to the watering trough. This water line may be supplied with a mechanical or electrical valve and actuating float which will allow the water to flow through the supply line when the water level in the trough is low enough, and, conversely, will shut off the flow of water in the supply line when the water level in the trough reaches a high enough level. The more expensive electrical valve is more positive and consequently offers an advantage of more accurate proportioning of the liquids. This supply line may also be provided with a constriction to the flow of water at any point therealong but positioned so that near the downstream end of this constriction an opening may be provided in the supply line which leads by way of a tube to a check valve at some distance therealong which further extends to the additive-containing liquid in the jar or tank. This check valve need only be of simple construction containing only one moving part, the plug, and means by which the additive-containing liquid can flow past the valve when the valve is in one of two positions and said liquid is stopped from flowing past the valve when the valve is in the other of two positions. The amount of flow of the additive-containing liquid may be metered by either the cross-sectional area of the terminal end of the tube submerged in said liquid or a screw valve positioned along the tube leading from said liquid to the supply pipe carrying the flowing drinking water.

The check valve operates by the force of water pressure. When the water is not flowing in the supply line, the water level in the supply line is higher than the additive-containing liquid level in the jar or tank and the force of the difference in water levels is sufficient to keep the check valve plug tightly closed to the flow of additive. Of course, the constant pressure of the water in the supply line created by the pump would be sufficient to keep the check valve closed regardless of the water levels. Consequently, dilution of the additive-containing liquid by the reverse-flow of supply water is avoided. Conversely, when the drinking water level in the trough decreases sufficiently to cause the float to cut on the flow of the drinking water through the supply line, even a slight flow of water from the supply line into the trough causes a relatively larger surge of water past the constriction in the supply line which tends to reduce the pressure of the water in the area near the downstream end of this constriction. Such reduction in pressure of this water allows the gravitational force on the check valve plug and mass of the additive-containing liquid to open the check valve and allow said liquid to flow freely into the supply line in a predetermined proportion. As previously stated, this proportion is predetermined either by the size of the orifice at the terminal end of the tube inserted in the additive-containing liquid or the adjustment of a screw valve located either above or below the check valve in the tube leading from the jar or tank containing the additive to the supply line. Obviously, the proportion of additive may also be regulated by changing its concentration in the additive-containing liquid.

A check valve of similar construction may be used near the top of the jar or tank to allow the free flow of air into the jar or tank while the additive-containing liquid is draining out. Should the water unexpectedly begin to dilute the additive-containing liquid to the point of overflow, this valve would be closed by the force of said liquid against it to prevent overflow.

Any water-soluble additive may be used successfully in this system. Such possible additives include vitamins, sulfonamides, arsanalates, furacin, Terramycin, Aureomycin, piperazines, and the like.

Additionally, the same system can easily be converted to proportionate non-internal additives such as insecticides, liquid fertilizers, and the like.

The check valve may be made of any suitable material such as metal, glass, plastic, or the like. One of the advantages that plastic has over the others is that troublesome crystallization of the additive on the parts of a plasic valve is less pronounced.

Having broadly described my invention, a more detailed description is afforded by reference to the accompanying drawings.

Figure 1:
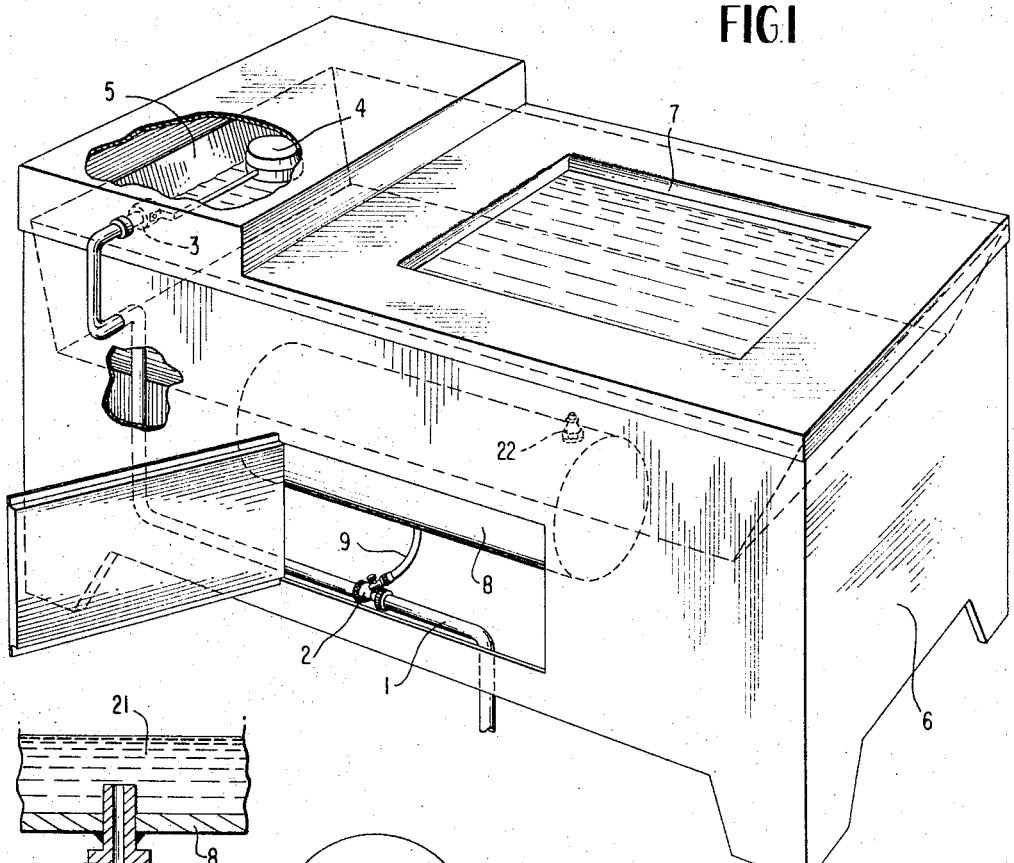
FIGURE 1 is a drawing of a watering trough showing the various detailed parts of the present invention.

In FIGURE 1, water is supplied through the supply line 1 along which is fitted a constriction coupling 2. The water flows out of supply line 1 through an ordinary mechanical float valve assembly 3 affixed to the terminal end of said line and actuated by an ordinary float 4.

The water which flows out of the supply line through the float valve assembly 3 is contained by the trough vessel 5 which is fastened securely to the trough chest 6. This trough chest 6 is supplied with a cut-out area opening 7 through which access to the water is afforded the livestock.

A tank 8 is positioned below the trough vessel 5 and connected to the supply line 1 by a tube 9 shown in greater detail in FIGURE 2.

Figure 2:
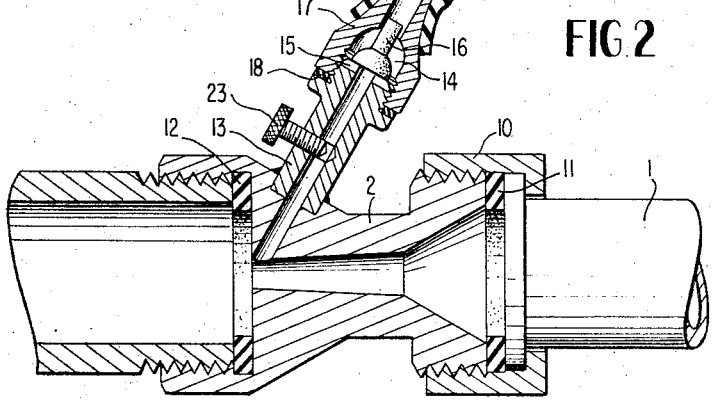
FIGURE 2 is a drawing of a check valve assembly that may be used to control the operation of the system.

FIGURE 2 shows how the supply line 1 is connected to the constriction coupling 2 by means of a threaded collar 10 at the upstream end and a threaded supply line at the downstream end. Both connections are fitted with gaskets, 11 and 12, affording a water-tight seal at each end.

The constriction coupling 2 has fastened thereto a rigid check valve base 13 through which an open shaft is contained affording an open shaft from the downstream end of the constriction to the plug chamber 14 passing through the plug seat 15. This plug seat is notched so that liquid may flow freely through it regardless of the position of the plug 16. The plug is held in place by the shaft through the plug housing 17, which is screwed to the check valve base 13, affording a water-tight seal to the plug chamber 14 when aided by gasket 18.

The check valve end of the tube 9 is pressed over the head of the plug housing 17 and held in position by the circular flange 19. The tank end of the tube 9 is similarly pressed over the rigid shaft housing 20 which extends through the shell of the tank 8 in a water-tight manner. This shaft housing 20 contains an open orifice shaft of constant diameter through which the additive-containing liquid 21 may flow.

As seen in FIGURE 1, the tank 8 is afforded a valve assembly 22 through which air can freely flow. This valve assembly 22 is designed exactly like the valve assembly 13–19 shown in detail in FIGURE 2 except for the omission of the screw 23 and the opening provided therefor in that valve assembly. The purpose in this valve assembly 22 is to afford the free flow of air into the tank 8 while the additive-containing liquid is flowing from the tank and provide an automatic closing of this opening to prevent overflow of the additive-containing liquid. The tank 8 can be charged with additive in any desired concentration through the opening provided for valve assembly 22 or through the tube 9.

Figure 3:
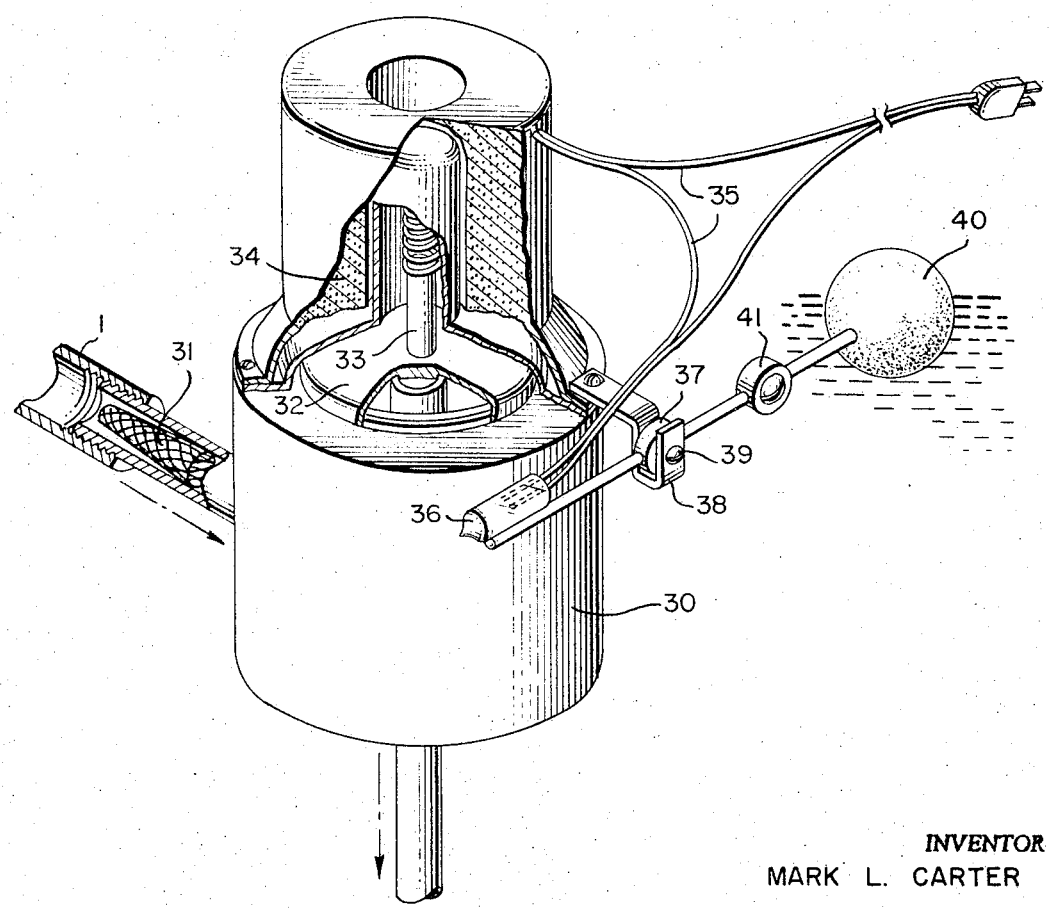
FIGURE 3 is a drawing of an electrical valve and actuating float assembly that may be used to start and stop the flow of water to the watering trough.

FIGURE 3 shows an electrical solenoid-type valve assembly 30 that may be used as a substitute for the mechanical valve assembly 3 and actuating float 4. This electrical valve assembly 30 is attached to supply line 1 replacing mechanical valve assembly 3 and actuating float 4. The float 40 is heavier than mercury switch 36 and will rotate downward about the pivotal float hinge 37 that is loosely fitted around bolt 39 secured into float hinge collar 38. If the liquid level in the trough is low enough so that float 40 as adjusted by float adjustment 41 comes to rest at its floating level in the liquid at a point of rotation about pivotal float hinge 37 sufficiently depressed to have elevated mercury switch 36 to a point at which the liquid mercury flows into contact with electrical lead lines 35, the resultant electrical circuit energizes the solenoid 34. The energized solenoid 34 lifts the spring held pin 33 opening valve 32 to the flow of liquid through filter scren 31 into the watering trough. Conversely, when the liquid level in the trough rises rotating float 40 to a point at which the liquid mercury flows out of contact with electrical lead lines 35, the electrical circuit and solenoid 34 are de-energized allowing the spring held pin 33 to close valve 32 interrupting the flow of liquid to the watering trough. The back pressure of the liquid then closes plug 16 in the same manner as with the mechanical valve 3 and actuating float 4.

I claim:

1. Apparatus for delivering water containing an automatically controlled proportion of liquid additive to an ordinary watering trough for livestock comprising a pipe having an inlet end and delivery end for delivery of said water, a metering tube for delivery of said additive to said pipe and joined therewith in flow relation, at a point wherein a constrictive opening is provided in said pipe, said metering tube including an additive-receiving orifice at one end thereof of a pre-determined cross-sectional area designed to permit a measured flow of additive, a check valve consisting of a plug chamber and a plug positioned therein, said plug being free to move to at least a first position allowing metered flow of additive therearound and to a second position preventing the flow of water therearound, and an additive delivery orifice at the other end of said tube of a predetermined cross-sectional area allowing a measured flow of additive into said water pipe at said constrictive opening provided therein, and a float-actuated, electrical, solenoid-type valve assembly between said constrictive opening in the pipe and the delivery end of said pipe capable of providing a positive on-off flow control over the additive-containing water being delivered through said pipe.

2. Apparatus described in claim 1 in which the metering tube includes additional metering means to regulate the flow of additive from its source to the pipe.

3. Apparatus described in claim 2 in which said additional metering means comprises a thumb screw adjustment to said additive flow.

References Cited

UNITED STATES PATENTS

| | | | |
|---|---|---|---|
| 1,811,375 | 6/1931 | Wysong | 119—72.5 |
| 2,588,255 | 3/1952 | Larsh | 137—604 X |
| 3,129,694 | 4/1964 | Arrington | 119—81 |

HUGH R. CHAMBLEE, *Primary Examiner.*

SAMUEL KOREN, *Examiner.*